United States Patent [19]

Ingenhoven

[11] Patent Number: 4,645,050

[45] Date of Patent: Feb. 24, 1987

[54] DEVICE FOR ACTUATING A MOTOR VEHICLE DOOR CLOSURE

[75] Inventor: Jürgen Ingenhoven, Velbert, Fed. Rep. of Germany

[73] Assignee: Kiekert GmbH & Co Kommanditgesellschaft, Heilingenhaus, Fed. Rep. of Germany

[21] Appl. No.: 733,150

[22] Filed: May 10, 1985

[30] Foreign Application Priority Data

May 19, 1984 [DE] Fed. Rep. of Germany ....... 3418802

[51] Int. Cl.4 .................... F16D 13/14; E05B 47/00
[52] U.S. Cl. ........................ 192/36; 192/35; 192/54; 192/78; 192/93 R; 70/279
[58] Field of Search ............ 192/35, 36, 54, 78, 192/93 R, 107 T; 70/237, 279

[56] References Cited

U.S. PATENT DOCUMENTS

| | | | |
|---|---|---|---|
| 1,806,340 | 5/1931 | Francis | 192/54 X |
| 2,301,849 | 11/1942 | Bialy | 192/54 X |
| 3,261,437 | 7/1966 | Kramm | 192/35 X |
| 3,300,003 | 1/1967 | Peterson | 192/35 X |
| 3,817,360 | 6/1974 | Bianchi | 192/93 R X |

Primary Examiner—Rodney H. Bonck
Assistant Examiner—David A. Testardi
Attorney, Agent, or Firm—Karl F. Ross; Herbert Dubno

[57] ABSTRACT

A clutch for a power door lock includes an input gear wheel which is formed as a hollow cylindrical input gear wheel, a cam arranged in the input gear wheel and connected thereto, an output gear wheel with coupling drum, and a resilient coupling element controlled by the cam and adapted to be spread. The coupling element is provided with actuating projections. When the clutch is engaged, the actuating projections operatively contact the interior wall surface of the coupling drum. The input gear wheel is journaled on a driving sleeve at which is connected on the one hand a driving disc with driving pins adapted to engage in the coupling element and also a brake disc with an annular spring mounted thereon, to which annular spring is coordinated a stop. The coupling element is a unitary component having a substantially rectangular, elastically deformable frame which inherently is formed as a reset spring, and at two opposite sides of which are provided the actuating projections. The coupling drum presents a noncircular inner wall surface at which the actuating projections engage for transmission of motive power from the drive motor to the control rod actuating the closure.

6 Claims, 5 Drawing Figures

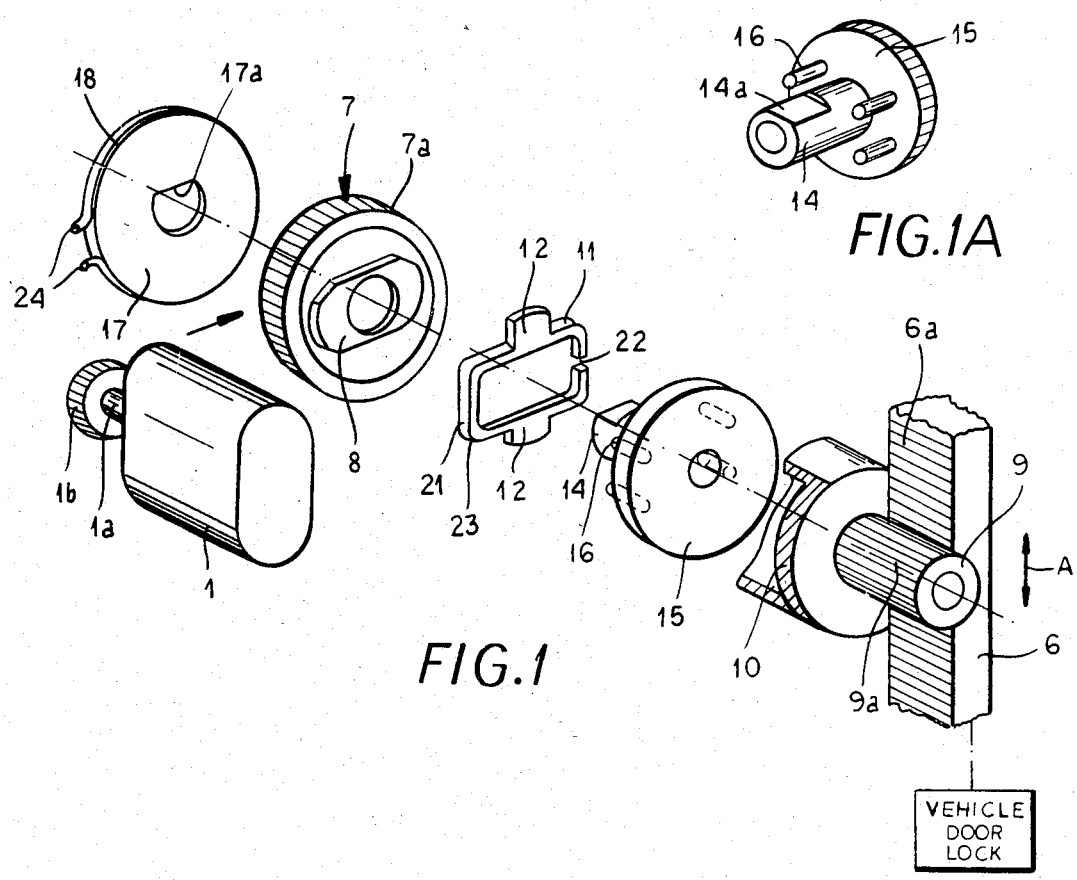
FIG.1A
FIG.1
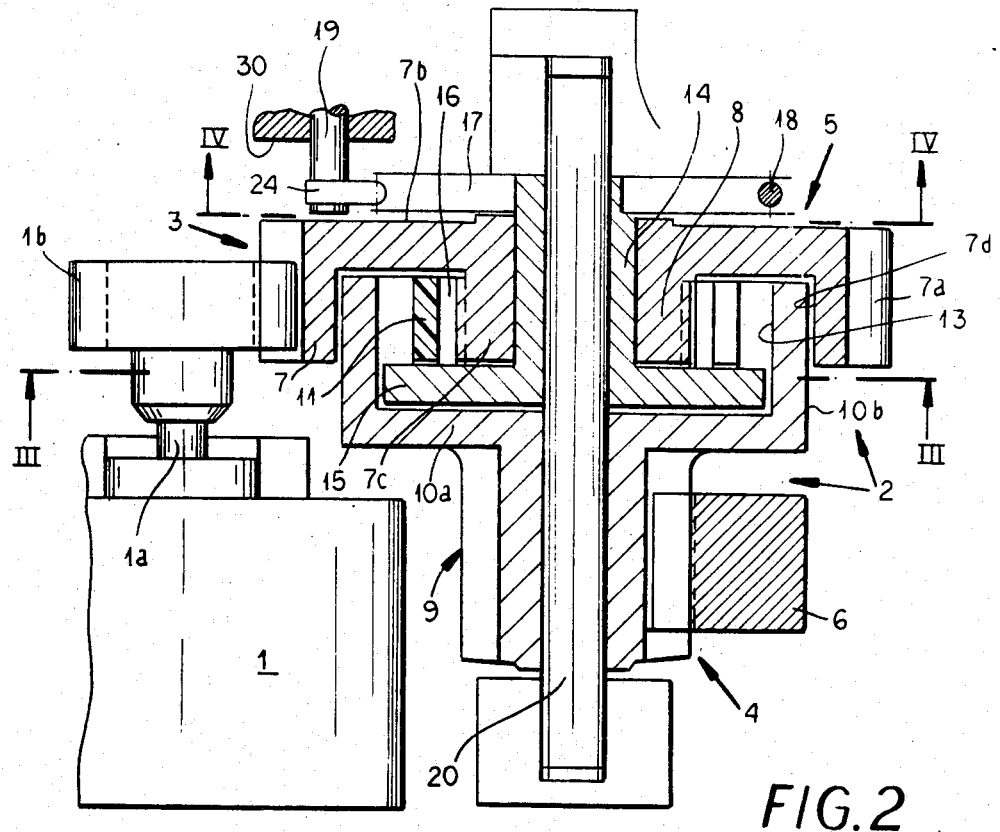
FIG.2

DEVICE FOR ACTUATING A MOTOR VEHICLE DOOR CLOSURE

FIELD OF THE INVENTION

My present invention relates to a motorized device for actuating a motor vehicle door latch.

BACKGROUND OF THE INVENTION

It is advantageous to provide an automobile door locking mechanism with an electric motor which can be driven in two drive directions, and includes a transmission having input side connected to the drive motor and output side connected to the latch mechanism and bolt. The device can further include a clutch for the transfer of motive power from the drive motor to the closure, which clutch can be engaged and disengaged in each of the two drive directions of the drive motor.

A control rod, for example a gear rack, is indirectly or directly connected to the output side of the transmission, and this control rod is connected to the motor vehicle door closure, for example the door lock. The control rod must be permitted to move and thus the output element of the transmission to freewheel when the clutch is disengaged.

In a known device of this type the coupling element is comprised of two parts which are connected by a reset spring causing the respective resilient return. A clutch drum has a cylindrical inner wall surface engaged by a clutch element in the known device without a detrimental amount of clutch slippage. However, it is a drawback of the known device that it is of rather bulky configuration, and its assembly is quite difficult. This is disadvantageous because such devices for actuating motor vehicle doors generally must be mass-produced items. Furthermore, the complex construction contributes to a reduction in service life.

OBJECTS OF THE INVENTION

It is the principal object of my invention to provide an improved device for actuating the door closure or lock of motor vehicles in which the assembly of the various components for the transmission of motive power is of simple construction and uses fewer parts.

It is also an object of this invention to provide a device for actuating the door closure of motor vehicles which is easily assembled.

It is furthermore an object of the invention to provide such a device which has an increased service life without detrimental reduction of its functional efficiency.

It is yet another object of the invention to ensure effective coupling in the device with respect to both drive directions of the associated drive motor.

SUMMARY OF THE INVENTION

These objects are attained in accordance with the invention by forming the coupling element as a unitary component having a substantially rectangular and elastically deformable frame such that the element is inherently formed as a reset spring. The unitary coupling element has engaging projections at two opposite sides, and the coupling drum has a non-circular inner wall surface when considered with respect to drum axis.

Thus, when considered in the direction of the central longitudinal drum axis, the coupling drum can have a slightly oval or elliptical cross sectional configuration.

In accordance with another aspect of the invention, the rectangular frame can have a gap in one frame side.

In accordance with yet another preferred embodiment which is characterized by simplicity and functional reliability the rectangular frame is formed at each one of two oppositely arranged, longitudinal frame sides with a respective actuating projection. These actuating projections are integrally formed with the frame.

It is also preferred that the gap is provided in a short side of the rectangular frame.

Moreover, the rectangular frame has at least interiorly rounded frame corners and, in conformity with the rounding, at these are arranged and co-act the respective driving or drive pins carried by a member which is coupled with a brake.

The material of construction for the coupling element may be any of various materials within the framework of the invention but preferably is an injection-molded synthetic resin or plastic.

More specifically the motorized door closure unit of the invention can comprise a drive motor having two drive directions, a transmission with an input connected to the drive motor and with an output, a clutch which can be engaged and disengaged, for the two drive directions, whereby a control rod is connected at the output and is connected to the vehicle door closure mechanism and can freewheel when the clutch is disengaged.

The clutch includes an input gear wheel formed as a hollow wheel, a cam disk within this wheel, an output gear wheel with a clutch drum, and the clutch element controlled by the cam, adapted to be spread, being resilient, and provided with engaging projections.

The engaging projections when the clutch is engaged, contact the interior wall surface of the coupling drum. The input gear wheel is journaled on a driving sleeve at which is connected on the one hand a driving disc with driving pins which engage in the clutch element, and on the other hand a brake disc with an annular spring to which annular spring is coordinated a retainer or abutment.

The key advantages of the invention is that the clutch and transmission for motive power from the drive motor to the control rod is considerably simplified. This results for one from the fact that fewer components are used. At the same time, the assembly is less complex. Although in the device according to the invention one does not ensure that the coupling element is symmetrically deformed on actuation by the cam, a positive coupling action in both drive directions is ensured. This is derived from the non-round inner wall surface of the coupling drum, when considered in the direction of the drum axis.

BRIEF DESCRIPTION OF THE DRAWING

The above and other objects, features and advantages will become more readily apparent from the following description, reference being made to the accompanying drawing, in which:

FIG. 1 is an exploded perspective view of the device according to the invention;

FIG. 1a is a perspective view of the driving disc allowing better viewing of the other side thereof;

FIG. 2 is an axial cross section along the central longitudinal axis of the assembled device;

SPECIFIC DESCRIPTION

Figure 3:
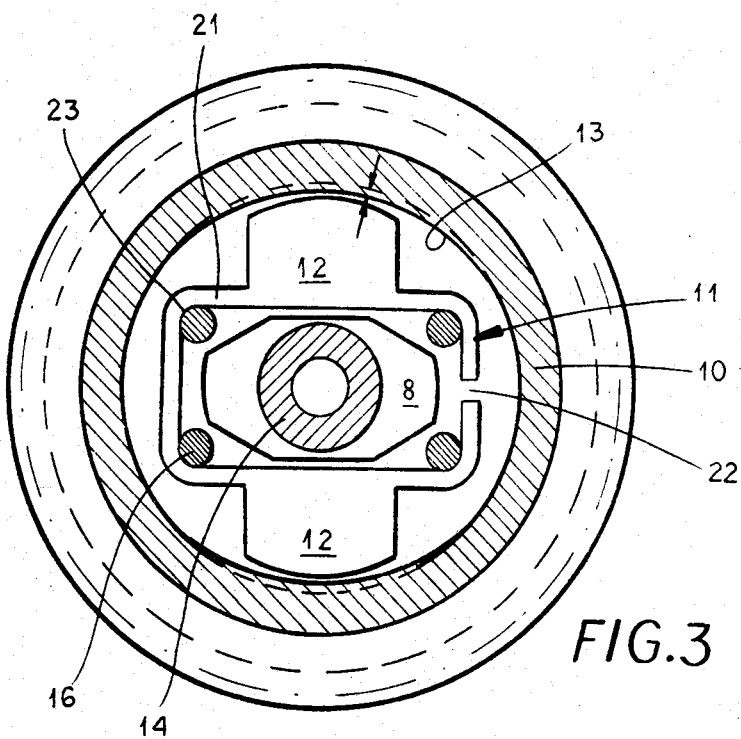
FIG. 3 is a cross sectional view taken along line III—III in FIG. 2.

The device shown in the drawing serves to actuate the door closure mechanism, not shown in detail, of a motor vehicle. The door closure is usually a door lock.

In its basic configuration, the device includes a drive motor 1 having two drive directions, i.e. the shaft 1a and the gear wheel 1b mounted thereon can be rotated in clockwise direction and in counterclockwise direction.

The device further includes a transmission generally designated by reference numeral 2, with an input or input side 3, which is connected to the drive motor 1 and with an output or output side 4, and which includes a clutch 5 which can be engaged and disengaged.

The output 4 is indirectly or directly connected to a control rod or gear rack 6 which, in turn, is connected to the door closure. The rack 6 is disengaged from the motor and free running when the clutch is disengaged. Although FIG. 1 shows a gear rack 6, other equivalent means to connect the device to the door closure mechanism may be used.

The clutch 5 and the transmission 2 are compactly interconnected, i.e. elements of one are nested in elements of the other.

The clutch 5 includes an input gear 7 having external gear teeth 7a. The effective width of the gear teeth 7a is greater than the axial thickness of the disc-shaped web 7b connecting the gear teeth 7a with the hub portion 7c of the input gear 7. Accordingly, a cylindrical hollow space 7d directed towards the output side 4 is provided in the input gear 7. A cam 8, e.g. a cam disc, is arranged in this hollow space and fixed integrally to the input gear 7. In the drawing, the cam 8 is shown as a projecting boss element or generally rectangular configuration projecting towards the output side 4, and the cam 8 is integrally formed with the disc-shaped wall 7b of input gear 7.

The clutch 5 further includes an output gear wheel or pinion 9 which meshes with the rack 6 as required in the operation of the door closure. In the direction of the input gear 7, the pinion 9 includes a coupling drum 10 comprised of a wall 10a which extends generally parallel with respect to the spoke portion 7b of the input gear 7, and comprised of an integral ring or shoulder portion 10b which reaches into the hollow space of the input gear 7 (FIG. 2).

In addition, the clutch 5 includes a coupling element 11 which is controlled by the cam 8. The coupling element 11 is adapted to be spread as well as being adapted to resiliently return to its initial or rest position. The coupling element 11 has two engaging projections 12.

The engaging projections 12 operatively contact, when the clutch 5 is engaged, the inner or interior wall surface 13 of the coupling drum 10, i.e. the interior wall surface 13 of the ring portion 10b.

The input gear wheel 7 is journaled on a driving sleeve 14 which is connected, near the wall 10a, to a driving disc 15 having driving pins 16. There are four driving pins 16 which project towards the cam 8 and which are adapted to engage in the coupling element 11.

A brake disc 17 is also mounted on the driving sleeve 14 adjacent the web 7b of the input gear wheel 7. For this, the driving sleeve 14 has a flattened face 14a, see particularly FIG. 1a, and the respective central hole in the brake disc 17 has a corresponding straight face 17a. A circular or ring spring 18 is placed about the circumference of the disc 17. This spring is also referred to as retarding or brake spring. A retainer 19 is associated with an annular spring 18.

It will be readily understood that the components of the clutch 5 are directly or indirectly journaled on a continuous coupling shaft or axle 20.

Figure 4:
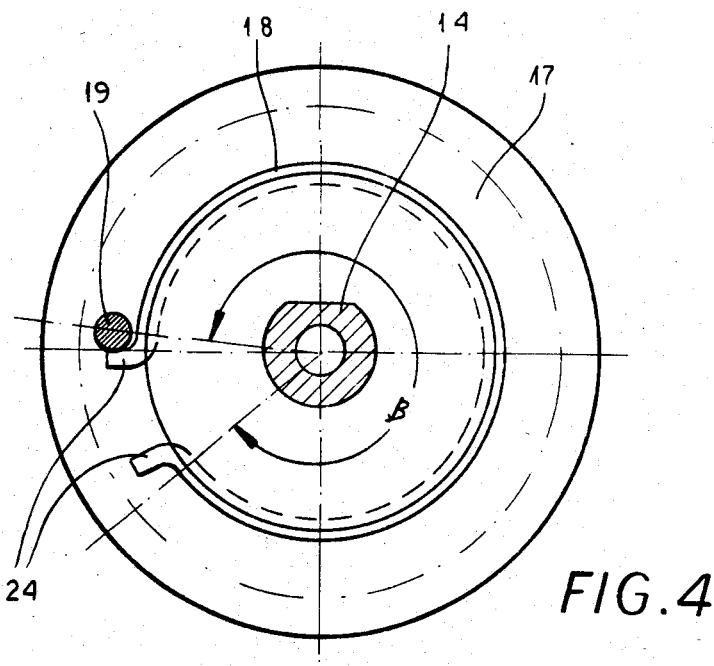
FIG. 4 is a cross sectional view taken along line IV—IV in FIG. 2.

The cooperation of the cam 8, the coupling element 11, and the coupling drum 10 is particularly evident from FIG. 3, whereas FIG. 4 illustrates the cooperation of the annular spring 18 and the stop or retainer 19 for the spring ends 24.

From FIG. 3 is will be apparent that the coupling element 11 is a unitary component having a generally rectangular frame 21. The frame 21 can be elastically and resiliently deformed, to form an inherently reset spring. An engaging projection 12 is respectively formed at each one of the two oppositely disposed, longitudinal sides of frame 21. These sides extend horizontally in FIG. 3.

The coupling drum 10, i.e. the ring or shoulder portion 10b thereof, has a non-round inner wall surface 13 when considered in the direction of the central longitudinal drum axis. Thus, the inner wall surface 13 as shown is slightly elliptical.

The rectangular frame 21 has a gap 22 in the right-hand short side thereof and, accordingly, the frame 21 may be spread as mentioned. The frame 21 of the shown embodiment has rounded interior and exterior frame corners 23. As shown in FIG. 3, the driving pins 16 of the driving disc 15 can be positioned against the interior rounded frame corners 23.

With respect to the material of construction, the entire coupling element 11 including the actuating projections 12 is made of a plastic or synthetic resin material which can be shaped by injection molding.

In the device according to the invention, the rack 6 is actuatable in two directions in conformity with the drive direction of the drive motor 1. When the drive motor 1 is in the 'off' position, the rack 6 can freely move in both directions, i.e. up and down (see arrow A in FIG. 1). The door closure can then be manually operated.

The output torque of drive motor 1 is continuously transmitted to the input gear wheel 7. Thus, the output torque of the drive motor is also imparted to the cam 8 forming part of the input gear 7. The rack 6 is then operated since the cam 8 radially presses the actuating projections 12 of the coupling element 11 against the inner wall surface 13 of the coupling drum 10. As indicated in the foregoing, the wall surface 13 is non-round, preferably slightly oval or elliptical.

In order to attain the desired functioning, the component comprised of the driving sleeve 14, driving disc 15 with driving pins 16, and brake or deceleration disc 17, is required. During the commencement phase, the brake disc 17 with the retarding or brake spring 18 serves to provide the necessary delay of the coupling element 11 with respect to the input gear wheel 7. Without this delay, the coupling element 11 would only rotate and not effect coupling.

The spring 18 passes through an angle $\beta$ of rotation of approximately 200° to 320° before it is blocked by engagement of its projecting ends 24 with the stop or retainer 19 mounted in the respective housing 30 of the device according to the invention.

Hence the drive motor 1 is initially set into motion without load and only after the angular displacement $\beta$ is coupled to the load. Disengagement of the clutch 5 is achieved, firstly, by allowing the spring 18 to come into the relaxed condition which spring 18 resets the component with the driving sleeve 14, the driving disc 15 as well as the brake disc 17 by a certain amount and, accordingly, releases the coupling element 11.

Since the coupling element 11 is also a self-resetting spring, it is now centrally disposed on the driving pins 16 and the mentioned free-running via the output gear wheel 9 is possible.

The device serves to actuate the control rod or rack 6 which, in turn, moves the closure, not shown, e.g. a door lock, also referred to as power door lock in the art.

While it may be desirable to use the power feature, it may equally be desirable to manually actuate the lock, wherefore the rack 6 can be moved manually by an actuating rod or the like, not shown. Movement of the rack 6 is 'up' or 'down', for example.

In view of the gear teeth 6a of the rack 6, the output gear wheel 9, due to its circumferential gear teeth 9a meshingly engaging the gear teeth 6a, is also rotated when the rack 6 is moved.

Merely by way of example, when the rack 6 moves upwardly (FIG. 1), the output gear 9 moves in a counterclockwise direction.

The gear wheel 1b of the drive motor must turn in a clockwise direction (as seen in FIG. 1) to move the rack 6 'up', by rotating the input gear wheel 7 in the counterclockwise direction.

As mentioned, however, the output gear 9 can also be rotated when the drive motor 1 is at rest, i.e. when the clutch 5 is not engaged.

I claim:

1. An actuating device, especially for actuating a motor vehicle door closure, said device comprising:
   a bidirectional drive motor; and
   a clutch for transmission of motive power, said clutch comprising:
   a hollow input gear wheel adapted to be driven by said motor,
   a cam formation in said input gear wheel,
   a unitary resilient coupling element having a substantially rectangular, elastically deformable frame which is inherently capable of performing the function of a self-resetting spring, and controlled by said cam formation, said coupling element including engaging projections at two opposite sides of said frame,
   a coupling drum having a noncircular inner surface surrounding said element and engageable by said projections,
   an output gear wheel connected to said coupling drum for providing an output of the device,
   a driving sleeve carrying said input gear,
   a driving disc connected to said driving sleeve and having projecting driving pins which can engage in said coupling element,
   a brake disc mounted on said driving sleeve,
   a substantially annular spring wound about the perimeter of said brake disc, and
   means providing a stop for said annular spring.

2. The device defined in claim 1, further comprising a rack meshing with said output gear wheel and coupled to a door lock.

3. The device defined in claim 1 wherein said element has a gap in one frame side thereof.

4. The device defined in claim 2 wherein said rectangular frame includes in each opposite longitudinal frame side at least one of said engaging projections, with each engaging projection being integrally formed with its respective frame side, and wherein a gap is arranged in a short frame side.

5. The device defined in claim 1 wherein said rectangular frame has at least interiorly rounded frame corners for receiving thereat said driving pins.

6. A device, especially for actuating a motor vehicle door closure, comprising:
   a housing;
   a control rod, said control rod being adapted to actuate the respective motor vehicle door closure and also being adapted to move freely;
   a shaft rotatably journaled in said housing with its respective first and second ends;
   a driver mounted on said shaft for rotation therewith, said driver including a tubular sleeve for coaxially mounting the driver on said shaft near the first end thereof;
   a drive disc extending substantially perpendicularly with respect to the longitudinal central axis of said shaft and operatively connectable to said tubular sleeve, said drive disc including a plurality of projecting drive pins;
   an input gear wheel mounted on said tubular sleeve, said input gear wheel including a hollow cylindrical recess which presents an opening towards said control rod;
   a cam formation mounted in said input gear and connected thereto;
   an output gear wheel adapted to actuate the control rod having a coupling drum connected thereto, said coupling drum having, when viewed in the direction of the drum axis, a substantially noncircular inner wall surface, and said coupling drum extending at least in part into said hollow cylindrical recess through the opening thereof;
   a drive motor having two drive directions, and said drive motor being adapted to rotate said input gear wheel; and
   a coupling element, said coupling element including radially directed actuating projections, said coupling element being adapted to be controlled by said cam formation in said input gear, and said coupling element being resilient and being a unitary component having a substantially rectangular, elastically deformable frame which inherently is capable to perform the functions of a reset spring, and at which are connected at two opposite sides the actuating projections, said frame being capable of being spread at its respective ends to form a gap when controlled by said cam formation such that said actuating projections, when said clutch is engaged, operatively contact the interior wall surface of said coupling drum; and
   wherein said driving pins are adapted to engage in the coupling element.

* * * * *